United States Patent [19]
Juillerat

[11] Patent Number: 4,879,916
[45] Date of Patent: Nov. 14, 1989

[54] CONTACT SENSOR FOR CALIPERING PIECES SUCH AS WORKPIECES

[75] Inventor: Denis Juillerat, Le Locle, Switzerland

[73] Assignee: Meseltron S.A., Switzerland

[21] Appl. No.: 212,636

[22] Filed: Jun. 28, 1988

[30] Foreign Application Priority Data

Jun. 29, 1987 [CH] Switzerland ............... 02 443/87

[51] Int. Cl.$^4$ .............................................. G01B 5/00
[52] U.S. Cl. .................................... 73/865.8; 33/561
[58] Field of Search ........................... 73/866.5, 865.8; 33/169 R, 172 E, 503, 556–561

[56] References Cited

U.S. PATENT DOCUMENTS

| | | |
|---|---|---|
| 3,368,283 | 2/1968 | Le Vasseur . |
| 3,945,124 | 3/1976 | Jacoby et al. . |
| 4,523,382 | 6/1985 | Werner et al. ............... 33/561 |
| 4,601,111 | 7/1986 | Derchtold . |

FOREIGN PATENT DOCUMENTS

| | | |
|---|---|---|
| 1084107 | 1/1958 | Fed. Rep. of Germany . |
| 3313861 | 4/1983 | Fed. Rep. of Germany . |
| 0226367 | 8/1985 | Fed. Rep. of Germany ......... 33/559 |

OTHER PUBLICATIONS

Patents Abstracts of Japan, vol. 8, No. 147, (P-285) [1584], 10 Juillet 1984; & JP-A-59 46 802 (Mitsutoyo Seisakusho K.K.) 16-03-1984.

*Primary Examiner*—Robert R. Raevis
*Attorney, Agent, or Firm*—Pollock, Vande Sande & Priddy

[57] ABSTRACT

A contact sensor for very precise calipering of workpieces. The sensor has a force generating mechanism with two oppositely acting elastic members (64, 66) connected to one part (34) of the suspension device of a feeler (42) and deformable in the direction of movement of the feeler. An assembly carried by another part (36) of the suspension device includes an abutment (82), two mobile elements (72, 74) acting reciprocally on the two elastic members, and a spring (78) permanently biasing the mobile elements against the abutment from opposite directions. When the feeler is in a rest position, the two elastic members are pre-stressed by the mobile elements so that both elastic members remain under tension as long as movement of the feeler is confined to a calipering zone.

11 Claims, 5 Drawing Sheets

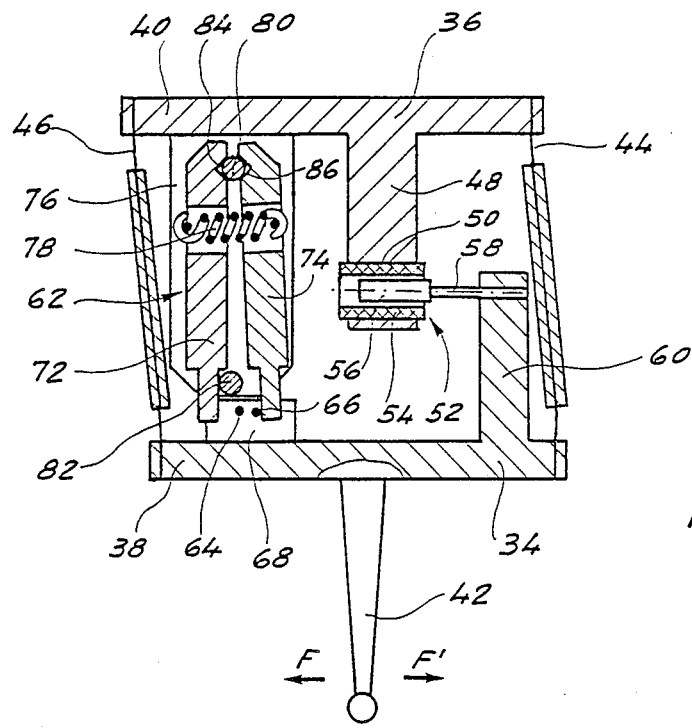
Fig. 8
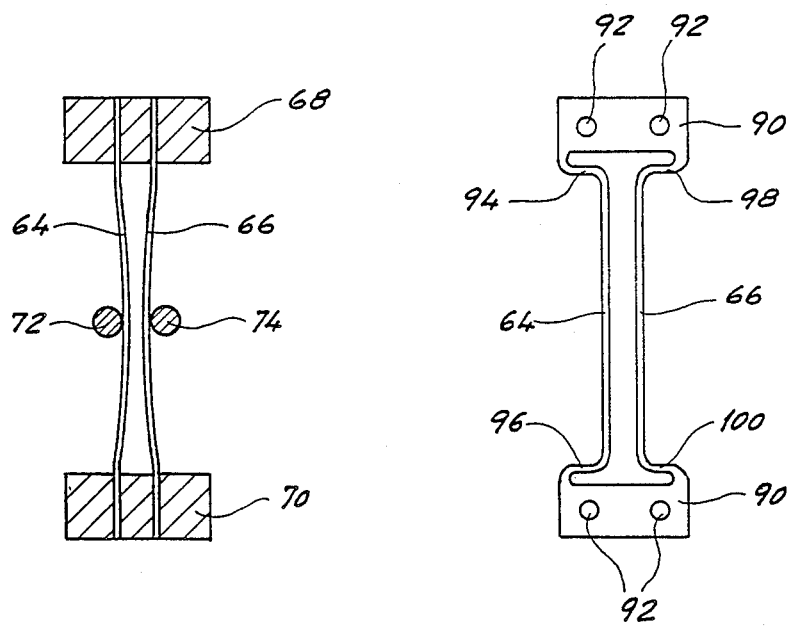
Fig. 7
Fig. 9

CONTACT SENSOR FOR CALIPERING PIECES SUCH AS WORKPIECES

BACKGROUND OF THE INVENTION

The present invention relates to contact sensors for calipering pieces such as workpieces.

Such sensors are incorporated in calipering apparatus which are frequently employed with machine-tools for controlling the dimensions of a workpiece with great precision during or at the end of machining.

More specifically, the invention concerns a sensor of the type comprising:

a feeler;

a suspension device comprising at least one first part to which the feeler is rigidly connected and a second part assembled for movement relative to one another in a first direction;

a transducer for measuring the amplitude of the relative movement of the first and second parts; and force generating means for holding the feeler in a stable rest position and allowing the feeler to exert on the surface of a piece to be calipered a bearing force which initially increases linearly and rapidly as the feeler moves away from its rest position in a calipering zone and which then increases at a slight rate in a disengagement zone, this force generating means comprising first elastic means connected to one of said parts of the suspension device and deformable in said first direction and an assembly carried by the other part of the suspension device which assembly comprises abutment means, two mobile elements which interact with the first elastic means, and second elastic means acting oppositely on these mobile elements to permanently bias them into abutting engagement with the abutment means, the first and second elastic means being such that, in the calipering zone, the mobile elements remain in contact with the abutment means to cause the first elastic means to deform and, in the disengagement zone, one of the mobile elements progressively moves away from the abutment means under the action of the first elastic means and against the action of the second elastic means which in turn are deformed.

A known sensor of this type is described in U.S. Pat. No. 3 945 124 and is shown schematically in longitudinal cross-section in FIGS. 1 and 2 of the accompanying drawings, FIG. 2 being a cross-section along line II—II of FIG. 1.

In this known sensor, the two above-mentioned assembled parts of the suspension device are constituted by two rigid plates 2 and 4, plate 2 carrying a feeler point 6. The plates 2 and 4 are connected by two elastic blades 8 and 10 so as to form a deformable parallelepiped which allows the feeler point 6 to move relative to the plate 4 (with which it is not rigidly connected) only in a direction parallel to this plate as indicated in FIG. 1 by the opposite arrows f and f'.

To simplify the drawing, the transducer e.g. of the capacitance or inductance type, for measuring the amplitude of movement of the feeler point, is not shown.

However, these Figures show the force generating means comprising a cage 12 fixed to the plate 4 and separated in two by a median wall 14 having therein recesses housing three balls 16 arranged around a circle. The diameter of balls 16 is slightly greater than the thickness of wall 14.

On either side of the wall 14 are two flanges 18 and 20 on the ends of rigid guide rods 22 and 24 slidably mounted in the cage 12 and biased by identical prestressed coil springs 26 and 28 to permanently hold the flanges 18 and 20 against the balls 16.

Finally, in this instance the force generating means also comprise a flexible rod 30 for example made at least partly of piezo-electric material. One of the ends of rod 30 is solidly fixed to the plate 2 and its other end carries a spherical head 32 of the same diameter as the balls 16. This head 32 is received in a fourth recess of the wall 14 and is located practically at the center of the circle on which the balls 16 are arranged.

Hence, as long as the feeler point 6 is not subjected to any action which makes it move relative to the plate 4 in the direction of arrows f and f', it remains in a rest position which serves as "zero" or reference position for the measurements, in which rest position the elastic blades 8, 10 and rod 30 of course are not deformed. In this state, which is shown in FIGS. 1 and 2, the head 32 of rod 30 exerts no force on the flanges 18 and 20 so that these flanges are in contact with the balls 16.

Suppose the plate 4 is fixed and a workpiece to be calipered is brought into contact with the feeler point 6 in the direction of arrow f'. At the moment of contact, the feeler point 6 is still in the rest position and exerts no bearing force against the workpiece.

If the workpiece is then further moved in the direction of arrow f', the elastic blades 8 and 10 bend and the flexible rod 30 also bends until the force exerted by the head 32 on the flange 18 equals the force of the spring 26. From then on, the rod 30 practically does not bend any more and the spring 26 is compressed along with further bending of the elastic blades 8, 10.

Of course, if the workpiece were brought in the direction of arrow f into contact with the feeler point 6 and continued to move in this direction, the blades 8, 10 and rod 30 would bend in the opposite direction and the flange 20 would be pushed against the spring 28.

Referring now to FIG. 3 which graphically illustrates the variation of the bearing force exerted by the feeler point 6 on the workpiece as a function of its movement relative to the plate 4, it can be seen that initially the force increases from zero linearly and rapidly as the rod 30 bends and then continues to increase linearly but much slower from the moment when the rod 30 moves one of the flanges 18 or 20 against the action of the spring associated therewith.

As already indicated, the zone in which deflection of the feeler corresponds to a rapidly increasing bearing force is where calipering measurements can take place. The other so-called "disengagement" zone is much larger and is provided for the purpose of preventing damage to the sensor and/or the workpiece during calipering. For example, it can brake and possibly stop the forward feeding of a workpiece on a machine-tool when the workpiece approaches the sensor or vice-versa.

The validity of the above discussion concerning the bearing force is based on the assumption that the balls 16 and head 32 have exactly the same diameter.

If, however, the diameter of the head 32 is slightly less than that of the balls 16, when the feeler point 6 is deflected the rod 30 does not bend immediately, but only when the head 32 comes into contact with one of the flanges. Consequently the measuring force, i.e. the force with which the feeler bears on the workpiece being calipered, results initially only from bending of the elastic blades 8 and 10 and is therefore practically zero as shown by curve A of the graph of FIG. 4 which is shown on a much bigger scale than FIG. 3.

If, however, the diameter of the head 32 is greater than that of the balls 16, the head 32 is from the beginning acted upon by the oppositely-acting springs 26 and 28 one of which allows the rod 30 to follow movement of the feeler against the action of the other. Because of this, the calipering force initially increases only very slowly. From the moment when the flange 18, if the feeler moves in the direction of arrow f', or the flange 20, if the feeler moves in the direction f, contacts the balls 16, this force begins to increase rapidly. This is illustrated by curve B of FIG. 4.

Hence, in both cases the rest position of the feeler is no longer well defined. This may result in a hysteresis phenomenon sufficient to disturb the accuracy of calipering if the difference between the diameter of the head of the rod and the diameter of the balls is of the same order of magnitude as the resolution of the sensor.

Consequently, if as is frequently the case the sensor should be able to measure to an accuracy of one tenth of a micron, the manufacturing tolerances for the balls and the head of the rod are so small that they are virtually zero. This evidently is a problem.

Moreover, during use of the sensor the balls do not wear at the same rate as the head of the rod which means that even if the problem of achieving the manufacturing tolerances has been overcome, there still remains a possibility of errors in the accuracy of calipering.

Finally, this type of sensor has a further defect, namely that for large deflections of the feeler the head of the rod slides and rubs against one of the flanges. This can also produce hysteresis and for this reason the calipering zone is necessarily of very limited dimensions. For example, with the sensors currently commercialized by Messrs. Ernst Leitz GmbH, proprietor of the cited US patent, calipering can only take place in a zone of +/− 16 micron. However, for some applications it would be advantageous to have a much larger calipering zone.

SUMMARY OF INVENTION

An object of the invention is to provide a sensor which does not have the above-mentioned drawbacks and this is achieved thanks to the fact that in the force generating means of the sensor according to the invention the first elastic means comprise two oppositely acting springs on which the mobile elements act reciprocally in opposite directions and which are prestressed by these elements when the feeler is in the rest position to a degree sufficient for said springs to remain under tension to a greater or lesser degree as long as the movement of the feeler is situated within the calipering zone.

BRIEF DESCRIPTION OF THE DRAWINGS

The invention will be better understood from the following description with reference to the accompanying drawings, in which:

FIG. 7 is a partial transverse cross-section along line VII—VII of FIG. 5, showing the shape of the two springs which constitute the first elastic means of the force generating means of this embodiment;

FIG. 8 is a cross-section similar to FIG. 5 showing the sensor in the state when the feeler is positioned in the disengagement zone;

FIG. 9 is a plan view showing another advantageous embodiment of the two springs and their securing means.

DESCRIPTION OF PREFERRED EMBODIMENTS

Figure 1:
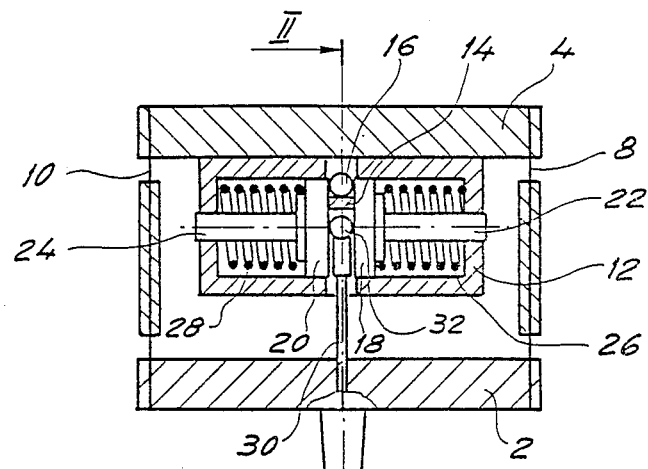
FIGS. 1 to 4 illustrate a prior art arrangement, as discussed above.

The sensor shown in FIGS. 5 to 8 comprises two rigid frame members 34 and 36 having respective flat parts 38 and 40. Part 38 carries a feeler point 42 and part 40 is fixed for example to a chassis or a support (not shown) of the sensor. These parts are interconnected by two elastic blades 44 and 46 to form therewith a deformable parallelepipedic frame allowing the parts to move relative to one another only in a single direction designated by arrows F and F' in FIGS. 5 and 8.

Figure 2:
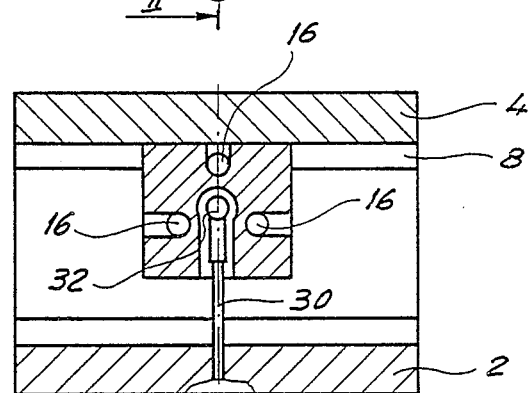
Figure 3:
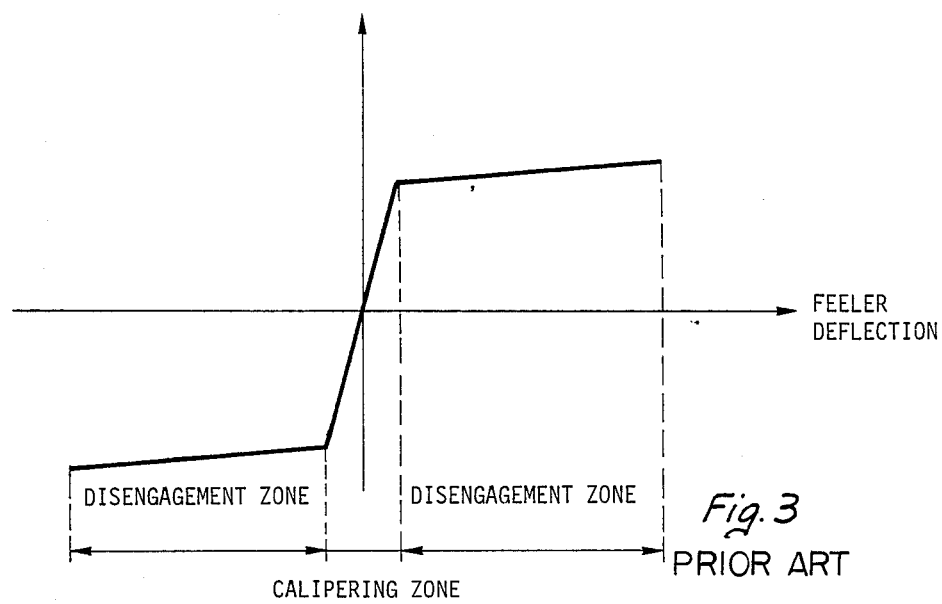
Figure 4:
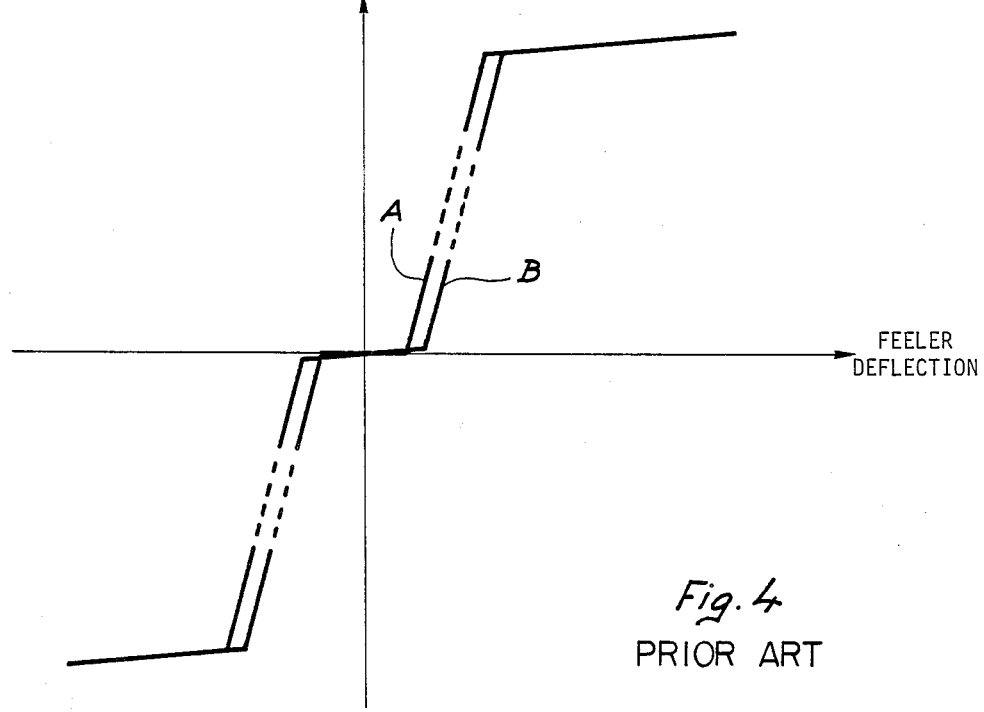

As for the known sensor according to FIGS. 1 and 2, the elastic blades 44 and 46 are such that their contribution to producing a bearing force of the feeler against a workpiece is as low as possible without, however, being so flexible as to allow even a minimal torsion or flattening of the parallelepipedic frame during a calipering operation. For this reason, the contribution of blades 44, 46 will be considered negligeable and will not be discussed further.

Figure 5:
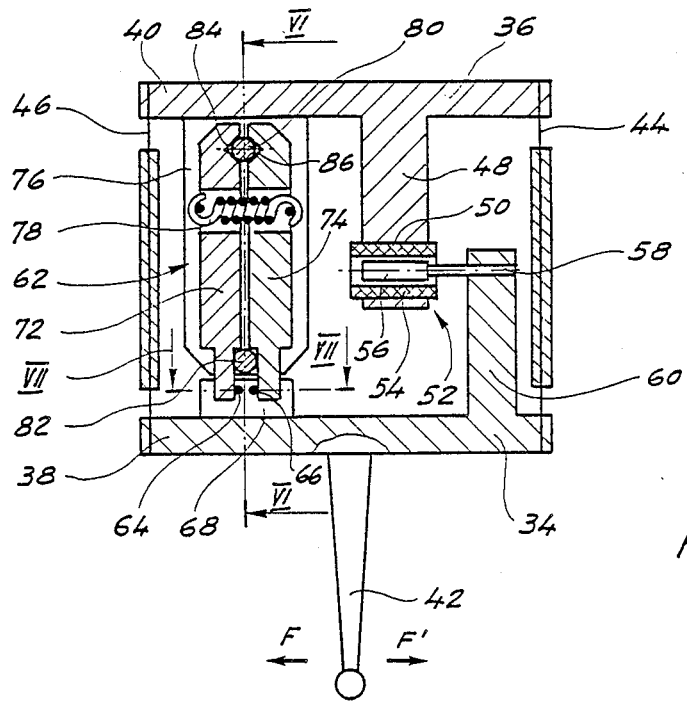
FIG. 5 is a view in longitudinal cross-section of an embodiment a one-dimensional sensor according to the invention with the feeler shown in the rest position.

As shown in FIGS. 5 and 8, the upper frame member 36 carries a projection 48 extending towards the lower frame member 34 and having near its end a cylindrical bore 50 the axis of which is substantially parallel to the direction F, F'. This bore 50 houses a coil 54 forming one of the elements of an inductive transducer 52 for measuring the amplitude of the movement of the feeler point 42 relative to the upper frame member 36. The other element of this transducer is a core 56 of magnetic material, for example a ferrite, fixed to the end of a rod 58 carried by a projection 60 integral with the lower frame member 34.

Of course, the coil 54 could equally well be carried by the projection 60 and the core 56 by the projection 48. Also, the inductive transducer 52 could be replaced by another type of transducer, for example of the capacitative type.

We shall now describe the part of the sensor in which the invention resides, namely the force generating means.

This force generating means designated by reference 62 comprises two identical, flexible rods 64 and 66, for example of metal, having a linear elasticity throughout the range of deformations these rods may undergo. The rods 64, 66 are secured by their ends to the lower frame member 34, in substantially parallel relationship closely spaced apart from one another, parallel to the planes of the frame members 34, 36 and orthogonal to the direction of movement F, F'.

Figure 6:
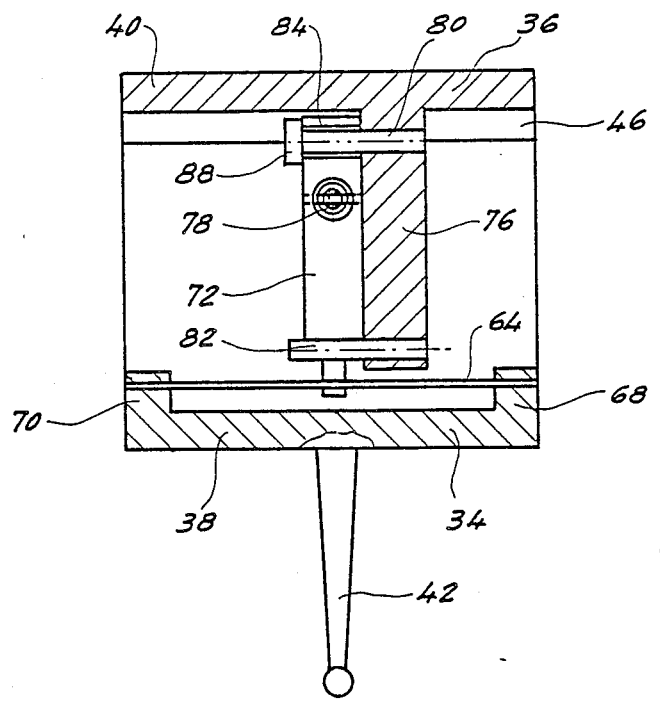
FIG. 6 is a longitudinal cross-section of this embodiment along line VI—VI of FIG. 5.

As shown in FIGS. 6 and 7, these rods 64 and 66, which constitute the two aforementioned oppositely acting springs, are held taut between two facing lugs 68, 70 of the lower frame member 34 with the ends of these rods imbedded in holes of these lugs.

With reference to FIGS. 5 and 7, it can be seen that the force generating means 62 also comprise, as the aforesaid mobile elements, twin levers 72 and 74 extending heightwise of the deformable frame and carried by another projection 76 of the upper frame member 36 such that when the sensor is in the rest position (FIG. 5) they are located practically in the intermediary plane of the flexible rods 64, 66 with their lower ends located on either side thereof symmetrical to a plane perpendicular to the direction of movement F, F' and equidistant from these rods.

Between these levers 72, 74 is a helical traction spring 78 biasing the levers together and tending to permanently hold them against two pins 80, 82 fixed to the projection 76 between these levers.

The pin 80 located near the base of projection 76 fits in facing V-shaped recesses 84, 86 of the levers 72, 74 adjacent their upper ends and thereby serves as support for and as common pivoting axis for both levers. Also, the pin 80 has a head 88 holding the levers 72, 74 against the projection 76 (see FIG. 6).

The other pin 82, located near the end of projection 76, constitutes the aforementioned abutment means.

When the feeler point 42 is in the rest position the levers 72, 74 are held against the pin 82 by the spring 78 and, in accordance with the invention, the rods 64, 66 are thereby prestressed, i.e. they are initially flexed in the direction of movement of the feeler, with the two rods bent in opposite directions (see FIG. 7).

In this state, the rods 64, 66 exert on the levers 72, 74 equal and opposite forces whose moment about the pivoting axis (80) is considerably less than the moment of the forces exerted on these levers by the spring 78.

The spring 78 is selected so that it also exhibits linear elasticity in the range of deformations it undergoes.

Referring now to FIG. 5, suppose that after the feeler point 42 has been brought into contact with a workpiece to be calipered it moves in relation to the upper frame member 36 in the direction of arrow F'. Initially, the two levers 72, 74 remain in contact with the pin 82 and as the feeler point 42 moves away from its rest position the rod 66 is bent even more while the rod 64 relaxes. The force exerted by the rod 66 on the lever 74 thus increases while the force exerted by the rod 64 on lever 72 decreases in the same proportions. Consequently, the bearing force of the feeler point 42 on the workpiece, which but for its sign is practically equal to the algebraic sum of the two, also increases and since the two rods have linear characteristics this increase is also linear and twice as rapid as that of the force of the rod 66 on lever 74.

When the moment of this force exerted on the lever 74 in relation to its pivoting axis becomes equal to the moment of the force to which it is submitted by the spring 78, this lever 74 is still in contact with the pin 82 and then, at the transition from the calipering zone to the disengagement zone, it begins to move away from the pin 82.

Of course, in order that the bearing force of the feeler always increases in the same manner until these moments become equal it is necessary for the initial flexion of the rods 64, 66 to be sufficient that the rod 64 remains deformed by the lever 72 up to this transition point, i.e. it may cease to be deformed from that instant. For greater security, it is preferable for the rod 64 to still remain slightly under tension at that instant.

Also, from the time when the lever 74 begins to move away from the pin 82, the bearing force of the feeler becomes practically equal and opposite to the force exerted by the lever 74 on the spring 78 multiplied by the ratio of the distances of the pivoting axis of this lever to the line of action of this force and to the plane in which the rods are situated, even though initially the rod 66, under the action of which the lever 74 is moved, still continues to be deformed slightly.

Consequently, in the disengagement zone there is obtained a bearing force of the feeler which increases linearly as a function of the movement thereof but much slower than in the calipering zone, this being provided by the spring 78. Also, it is advantageous to position this spring 78 close to the pivoting axis of the levers 72, 74 so that this variation is as slow as possible.

FIG. 8 illustrates what has just been explained. It also shows that unlike the lever 74, the lever 72 remains in contact with the pin 82 for obvious reasons.

Finally, in the case when the feeler point 42 moves in the direction of the arrow F, it is clear that the rod 64 will initially be further flexed and the rod 66 relaxes and then it will be the lever 72 that moves away from the pin 82.

It is also clear that with the described force generating means as soon as the feeler leaves its rest position the bearing force of the feeler necessarily increases rapidly to begin with, because in the starting position the rods 64, 66 are pre-stressed. Hence, even if the elements are manufactured with large tolerances, the sensor does not have the problem of initial linearity described in relation to FIGS. 1 and 2.

Moreover, there is no constraint preventing the sensor of the invention from having a very large calipering domain. For example, a sensor of this type has already been made with a calipering zone of +/− 100 micron and much bigger calipering zones could be provided if required.

The sensor of FIGS. 5 to 8 nevertheless has a minor disadvantage related to the manner of securing the rods 64, 66, namely there is a risk that the edges of the holes in the lugs 68, 70 may be slightly rounded or chamfered so that the rods 64, 66 may move and rub on these edges when they flex and the calipering may as a result not be absolutely accurate.

FIG. 9 illustrates a simple solution for overcoming this drawback, according to which there is provided, for example by electro-erosion, a monoblock assembly comprising the flexible rods 64, 66, two planar securing pieces 90 having holes 92 by which they can be screwed to the lugs of the lower frame member of the sensor and four generally S- or elbow shaped suspension sections 94, 96, 98 and 100 situated in the same plane as the rods and the planar securing pieces and connecting them so that the assembly has the same plane of symmetry as the rods.

Another possibility would be to not provide such planar pieces 90 but directly fix the free ends of the S-shaped sections 94, 96, 98, 100 to the lugs of the lower frame member, for example also by imbedding them in holes. These suspension sections limit the traction forces that the rods 64, 66 exert on their supports when they are flexed, thus preventing any movement of the rods.

In practice, the sensors used for calipering pieces in particular workpieces are generally not one-dimensional as shown in FIGS. 5 to 8 but are two-dimensional or three-dimensional so that they can simultaneously and/or selectively caliper along two or three rectangular coordinate axes.

Figure 10:
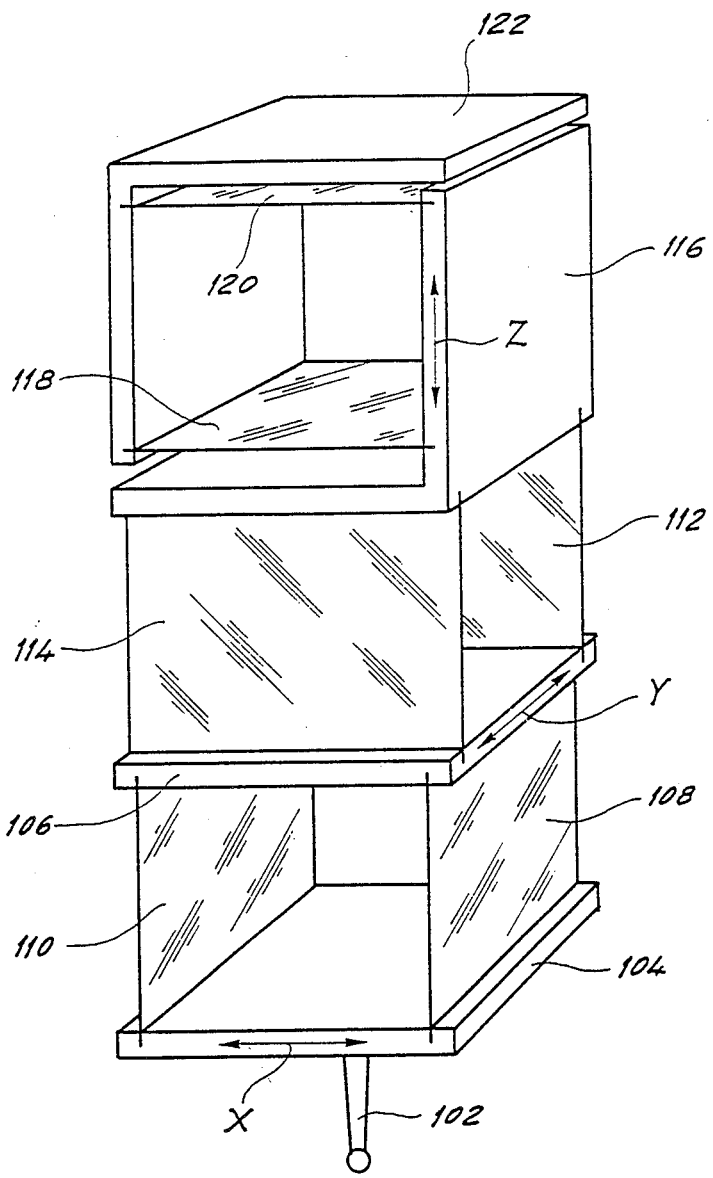
FIG. 10 is a perspective view schematically illustrating an example of an embodiment of the feeler suspension device for a three-dimensional sensor according to the invention.

FIG. 10 schematically shows how the feeler suspension device may for example be made for a three dimensional sensor.

This suspension device comprises a first frame member 104, schematically shown as a planar plate, carrying a feeler point 102 and which is connected to a second frame member 106, also schematically shown as a planar plate, by two elastic blades 108, 110 to form a first parallelepiped deformable in a first direction X.

The second frame member 106 is in turn connected by two further elastic blades 112, 114 to the horizontal part of a third L-shaped frame member 116 to form a second parallelepiped deformable in a second direction Y orthogonal to the first direction X.

Finally, the vertical part of the third frame member 116 forms, with two blades 118, 120 and the vertical part of another L-shaped frame member 122, a third parallelipiped deformable in a third direction Z orthogonal to the two others.

The horizontal part of the fourth frame member 122 is adapted for securing the suspension device to a housing or to a support for the sensor.

To obtain a three-dimensional sensor according to the invention, the suspension device which has just been briefly described is completed by fitting in each deformable parallelepiped a calipering transducer and force generating means like those of the sensor of FIG. 5 as well as the associated projections and lugs for supporting them.

It is clear that the invention is not limited to the described embodiment and the possible modifications that have already been described.

For example, it would be possible to envisage another modification in which the pivoting axes of the levers would not be the same but would be spaced parallel to one another with each lever having an associated abutment. For this, four pins would be provided instead of two.

In this case, instead of being engaged in V-shaped recesses the pins forming the pivoting axes could pass through the levers using an arrangement which prevents any play.

It would also be possible to replace the helical traction spring which acts on these levers by a torsion spring.

Furthermore, the flexible rods could equally well be carried by the upper frame member of the feeler suspension device and the other elements of the force generating means by the lower frame member.

Additionally, many other embodiments of this force generating means could be designed in which the flexible rods are replaced by helical traction or compression springs and/or in which the mobile pieces would no longer be levers but pieces able to move linearly in the same direction as the feeler.

Finally, it is self evident that the suspension device could also be different. For example, the elastic blades could be replaced by rigid plates or frames connected to the frame members by hinges of the crossed blade type, by ball joints or other types of articulation.

It would also be possible to replace the design of a deformable parallelepiped with an equivalent device having rectilinear ball or air bearings.

I claim:

1. A contact sensor for calipering pieces such as workpieces, comprising:
a feeler;
a suspension device comprising at least one first part to which the feeler is rigidly connected and a second part, the first and second parts being assembled for movement relative to one another in a first direction;
a transducer for measuring the amplitude of the relative movement of the first and second parts; and
force generating means for holding the feeler in a stable rest position and allowing the feeler to exert on the surface of a place to be calipered a bearing force which initially increases linearly and rapidly as the feeler moves away from its rest position in a calipering zone and which then increases slowly in a disengagement zone,
said force generating means comprising first elastic means connected to one of aid parts of the suspension device and deformable in said first direction, and an assembly carried by the other part of the suspension device, which assembly comprises:
abutment means,
two mobile elements which interact with the first elastic means,
and second elastic means acting on said two mobile elements to permanently bias them into abutting engagement with the abutment means from opposite directions,
the first and second elastic means being such that, in the calipering zone, the mobile elements remain in contact with the abutment means to cause the first elastic means to deform and, in the disengagement zone, one of the mobile elements progressively moves away from the abutment means under the action of the first elastic means and against the action of the second elastic means which in turn is deformed,
said first elastic means comprising two oppositely acting elastic members on which the mobile elements act reciprocally in opposite directions and which are prestressed by these elements when the feeler is in the rest position to a degree sufficient for said elastic members to remain under tension to a greater or lesser degree as long as the movement of the feeler is situated within the calipering zone.

2. A sensor according to claim 1, wherein the two oppositely acting elastic members are substantially identical flexible rods which are fixed by their ends to support elements of one of the parts of the suspension device and are arranged symmetrical to a first plane substantially perpendicular to said first direction and which are acted upon by the mobile elements to flex them initially in said first direction when said feeler is in the rest position.

3. A sensor according to claim 2, wherein said flexible rods are substantially parallel to one another.

4. S sensor according to claim 2 or 3, wherein said rods are fixed to said support elements through suspension sections which are arranged to limit the traction forces exerted by the rods on said elements when they are caused to flex.

5. A sensor according to claim 4, wherein said suspension sections are parts bent in generally S-shape in extension of and situated in the same plane as the flexible rods.

6. A sensor according to claim 2, wherein the middle elements are formed by twin levers which are substantially symmetrical to the first plane when the feeler is in the rest position and which can pivot in a second plane substantially perpendicular to the first plane.

7. A sensor according to claim 6, wherein the second plane passes substantially through the middle of the flexible rods.

8. A sensor according to claim 6 or 7, wherein the abutment means and the flexible rods are located between the levers, and wherein the second elastic means comprises a spring which biases there levers towards one another.

9. A sensor according to claim 1, 2 or 6, wherein said first and second parts of the suspension device are frame members connected together by elastic blades to form a parallelpiped which is deformable in said first direction.

10. A sensor according to claim 1, 2 or 6, wherein the suspension device further comprises a third part connected to the second part and a fourth part connected to the third part such that the second and third parts can move substantially parallel to one another in a second direction orthogonal to the first direction and the third and fourth parts can move substantially parallel to one another in a third direction orthogonal to the first and second directions, wherein two further transducers are provided for measuring the relative movements, respectively, of said second and third parts and of said third and fourth parts, and wherein two further force generating means are located, respectively, between said second and third parts and said third and fourth parts for providing a bearing force of the feeler in each of said second and third directions.

11. A sensor according to claim 10, wherein the four parts of the suspension device are connected together by elastic blades to form three parallelepipeds which are deformable respectively in said first, second and third directions.

* * * * *

UNITED STATES PATENT AND TRADEMARK OFFICE
CERTIFICATE OF CORRECTION

PATENT NO. : 4,879,916

DATED : November 14, 1989

INVENTOR(S) : Denis Juillerat

It is certified that error appears in the above-identified patent and that said Letters Patent is hereby corrected as shown below:

Column 8, line 16, change "aid" to --said--.

Column 8, line 55, change "S" to --A--.

Column 9, line 7, change "there" to --these--.

Column 9, line 12, change "parallelpiped" to --parallelepiped--.

Signed and Sealed this

Eighteenth Day of September, 1990

Attest:

HARRY F. MANBECK, JR.

*Attesting Officer*      *Commissioner of Patents and Trademarks*